May 10, 1927.
A. ROVELLI
1,627,575
CUTLERY HOLDER FOR COOKING RECEPTACLES
Filed May 4, 1925
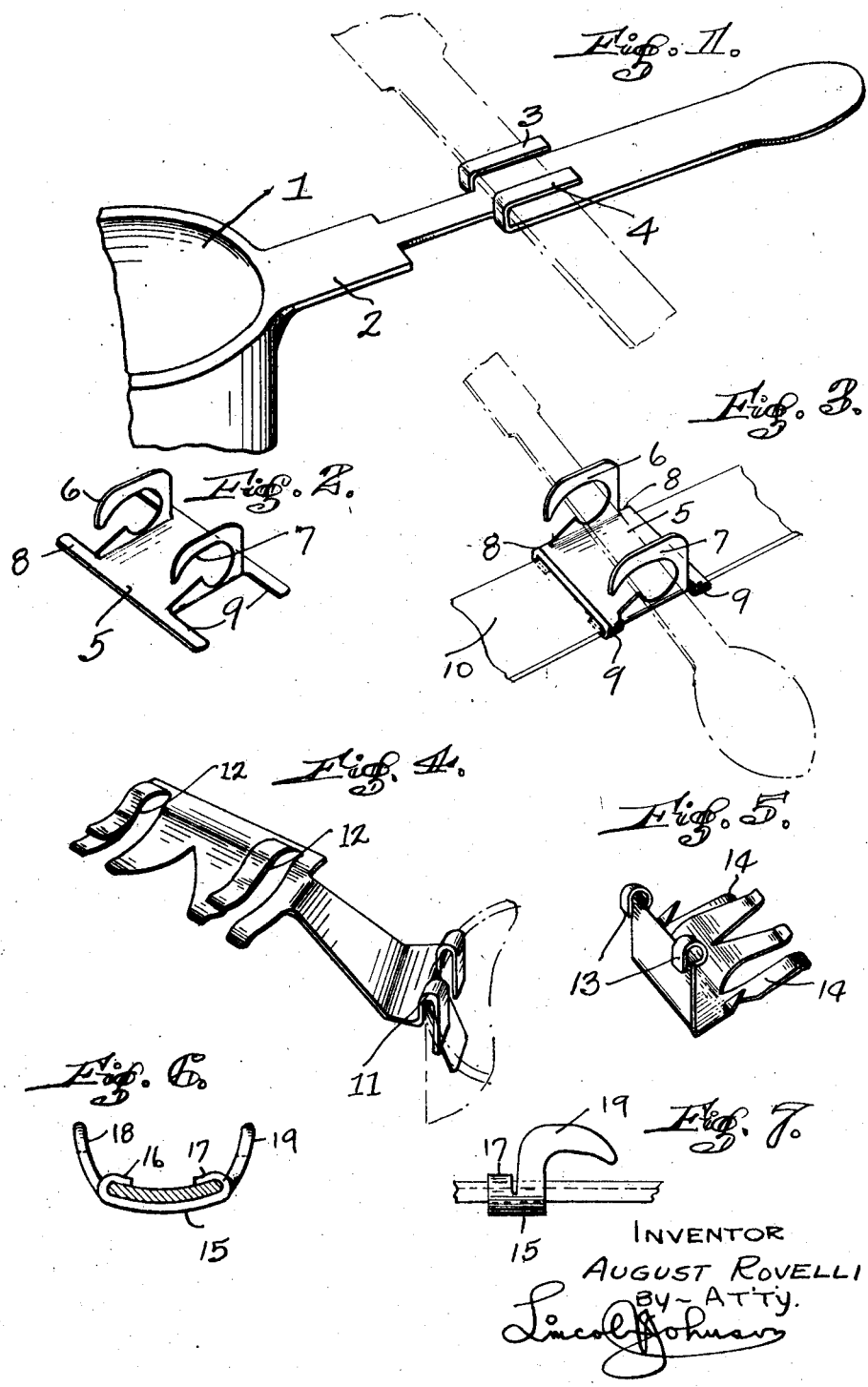
INVENTOR
AUGUST ROVELLI
BY ATT'y.
Lincoln Johnson Patented May 10, 1927.

1,627,575

UNITED STATES PATENT OFFICE.

AUGUST ROVELLI, OF SAN FRANCISCO, CALIFORNIA.

CUTLERY HOLDER FOR COOKING RECEPTACLES.

Application filed May 4, 1925. Serial No. 27,780.

This invention relates particularly to a cutlery holder for cooking utensils.

An object of the invention is to provide a rack either integrally or detachably secured to a cooking utensil, in which various articles of cutlery, used in cooking or preparing of foodstuffs, may be temporarily held.

A further object of the invention is to provide a cutlery holder which may be detachably clamped over the handle, or rim edge, of a cooking utensil so as to support an article of cutlery thereon in readiness to be used in the preparation of any articles being cooked in the said receptacle.

A still further object of the invention is to provide a cutlery holder, that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claim following the decription, it is desired to cover the invention in whatsoever form it may be embodied.

In the accompanying one sheet of drawings,

Fig. 1 is a perspective view of a cooking utensil, having a cutlery holder, constructed in accordance with my invention, formed as a part thereof.

Fig. 2 represents a perspective view of a cutlery holder blank constructed in accordance with my invention.

Fig. 3 is a perspective view of the cutlery holder shown in Fig. 2, mounted in operative position on a cooking utensil.

Fig. 4 is a perspective view of a modified form of cutlery holder mounted on a cooking receptacle.

Fig. 5 is a modified form of cutlery holder mounted on a cooking receptacle.

Fig. 6 is a section taken through a cooking receptacle having a modified form of cutlery holder mounted thereon.

Fig. 7 is a side elevation of Fig. 6.

The conventional type of a pot or pan or other cooking receptacle used in the preparation of food stuffs, and the like, is without any means thereon in which a spoon, fork, or other stirring tool may be placed to be held in readiness for use in cooking. As a usual thing, the cook that uses a spoon or fork, for stirring articles cooking in a receptacle, must lay the stirring tool at a point more or less remote from the cooking receptacle. In my invention I have provided a rack or holder which is adapted to be placed either on the handle, or rim, of a pot or pan and in which a stirring tool or other article of cutlery may be held in readiness for use.

In detail, the construction illustrated in the drawings, particularly in Fig. 1, comprises a cooking receptacle 1 having a handle 2 formed integrally thereon. On opposite sides of the handle 2, I have provided a complementary pair of tabs 3 and 4 cut from the handle 2. The tabs 3 and 4 are bent upwardly and backwardly over the handle 2 to form a rack into which an article of cutlery may be detachably positioned. The tabs 3 and 4 act as spring fingers to engage the body of the article of cutlery and to hold it in a semi-rigid position against the handle of the receptacle. The form of holder shown in Fig. 1 is of the permanent type, being an integral part of the cooking receptacle. In Figs. 2 and 3 I have shown a metal blank consisting of a main rack or holder 5 formed with a pair of complementary jaw members 6 and 7 thereon notched to receive an article of cutlery. On the outer ends of the rack 5 I have provided a plurality of fingers 8 and 9, each of which are bent downwardly around the under side of the handle 10, of the cooking receptacle, on which the rack 5 is mounted. The holder shown in Figs. 2 and 3 is of such a size that it may be fitted around approximately every size handle to be found on conventional cooking receptacles. The rack 5 can be mounted on or removed from the handles of the aforesaid cooking receptacles, so that the same holder may be used on any number of cooking receptacles at different times.

In Fig. 4, I have shown a holder having spring fingers 11 which are adapted to clamp over the rim edge of a cooking receptacle and to which a rack 12 is secured, in which the articles of cutlery are to be mounted. The form of device shown in Fig. 5 is similar to that shown in Fig. 4, and is comprised of the clamping fingers 13 for engaging the rim edge of the cooking receptacle and a cutlery holder 14 formed integrally therewith.

In Figs. 6 and 7, I have shown a holder 15, formed differently from any of the previously described types of holders. The holder 15 is formed with a curved body, having inwardly extended lugs 16 and 17 on its opposite ends, which are adapted to be received over the opposite sides of the handle of a cooking receptacle. Adjacent the lugs 16 and 17 on the opposite sides of the holder 15 I have provided complementary rack members 18 and 19, respectively. The rack members 18 and 19 extend above the upper surface of the handle on the cooking receptacle, and form a space between the said handle and rack, in which an article of cutlery is adapted to be received. In the form of cutlery holder shown in all of the figures, it is my intention to provide complementary body members in which the stirring tool may be held, so as to always be in readiness for use when desired.

Having thus described this invention, what I now claim and desire to secure by Letters Patent is:—

A cutlery holder for a cooking receptacle, comprised of a plate having a pair of jaws struck up from the face of the plate to extend substantially parallel to a surface of the plate and in spaced relation thereto, to support an article of cutlery, the edge of each jaw facing the plate and the matching portion of the plate having a hook shaped cavity therein to detachably hold the article of cutlery; and clamp members on the plate to detachably engage a cooking receptacle.

In testimony whereof, I have hereunto set my hand at San Francisco, California, this 24th day of April 1925.

AUGUST ROVELLI.